(No Model.)
R. H. PARK.
DEVICE FOR SEPARATING LIQUIDS OF DIFFERENT SPECIFIC GRAVITY.
No. 593,333. Patented Nov. 9, 1897.
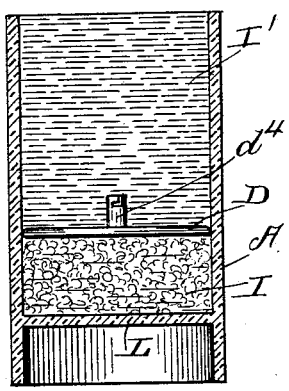
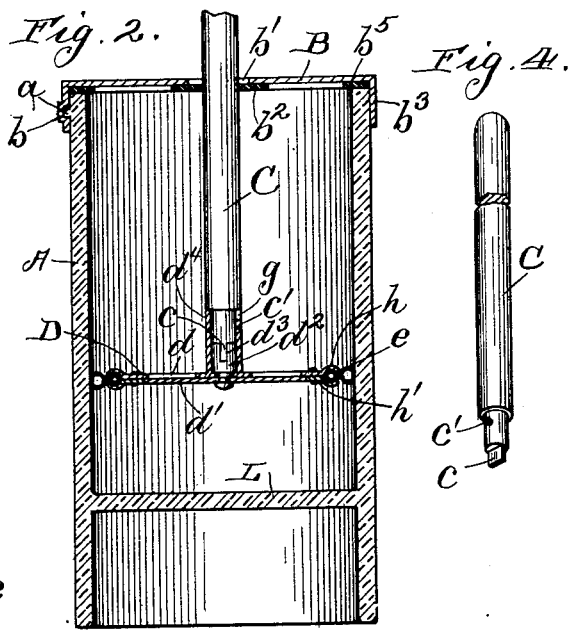
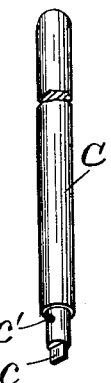
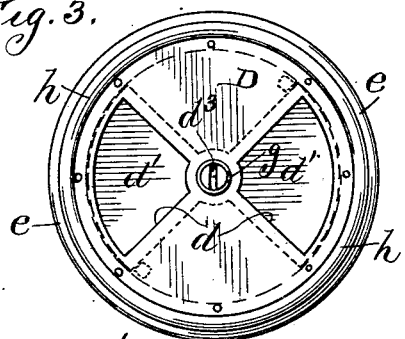
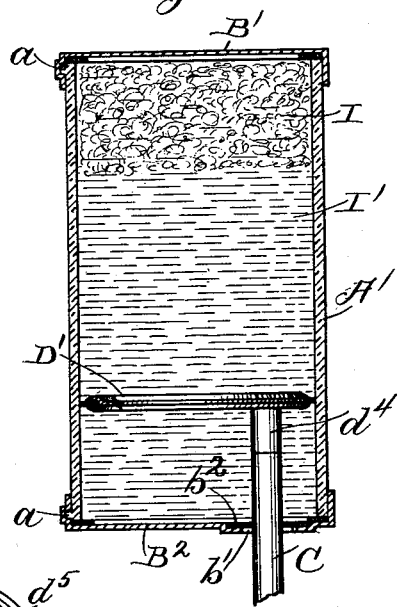
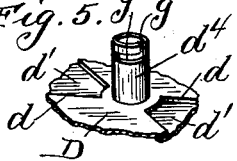
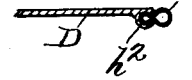
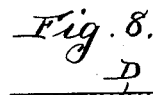
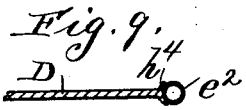
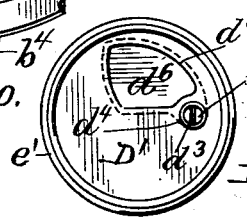
Witnesses:
R. J. Jacker.
E. A. Duggan.
Inventor:
Rufus H. Park.
By Chas. C. Tillman,
Atty.
THE NORRIS PETERS CO., PHOTO-LITHO., WASHINGTON, D. C.

UNITED STATES PATENT OFFICE.

RUFUS H. PARK, OF CHICAGO, ILLINOIS, ASSIGNOR OF ONE-HALF TO JACOB FEINBERG, OF SAME PLACE.

DEVICE FOR SEPARATING LIQUIDS OF DIFFERENT SPECIFIC GRAVITY.

SPECIFICATION forming part of Letters Patent No. 593,333, dated November 9, 1897.

Application filed January 22, 1897. Serial No. 620,270. (No model.)

*To all whom it may concern:*

Be it known that I, RUFUS H. PARK, a citizen of the United States, residing at Chicago, in the county of Cook and State of Illinois, have invented certain new and useful Improvements in Liquid-Separators, of which the following is a specification.

This invention relates to improvements in a device to be used for separating liquids of different specific gravity, but contained in the same vessel, and while it is more especially designed and intended to be used for separating the foam or froth from beer, yet it may be used for separating other liquids of different specific gravity; and it consists in certain peculiarities of the construction, novel arrangement, and operation of the various parts thereof, as will be hereinafter more fully set forth and specifically claimed.

The main objects of my invention are, first, to provide a liquid-separator which may be used in a vessel of the ordinary construction—that is, open at one end only—or in a vessel having both of its ends open and specially constructed and equipped for the operation and use of the parts of the separator, and, second, such a device which may be readily applied to or removed from the vessel and by means of which the separation of the liquids may be accomplished in a quick and easy manner.

In order to enable others skilled in the art to which my invention pertains to make and use the same, I will now proceed to describe it, referring to the accompanying drawings, in which—

Figure 1 is a vertical sectional view of a vessel, showing it filled with a liquid a portion of which is of less specific gravity than the other part and illustrating the separating disk or plate at a point to divide the same. Fig. 2 is an enlarged vertical sectional view of an empty vessel, showing its top covered, the separating disk or plate therein, and the manner of moving said disk vertically within the vessel. Fig. 3 is a plan view thereof with the cover and stem for operating the disk removed. Fig. 4 is a detail perspective view of a portion of the stem, showing it foreshortened for the convenience of illustration. Fig. 5 is a perspective view of a portion of the separating-disk with its socket-piece to receive the operating-stem. Fig. 6 is an internal perspective view of a portion of one of the covers for the vessel. Figs. 7, 8, and 9 are detail views in section of a portion of the separating-disk, showing modifications in the manner of securing thereto an annular cushion. Fig. 10 is a plan view showing a modification in the construction of the separating-disk, and Fig. 11 is a vertical sectional view illustrating a modification in the construction of the vessel and showing the manner of operating the modified form of disk therein.

Similar letters refer to like parts throughout the different views of the drawings.

A represents a vessel, which may be made of any suitable size and material, but preferably of glass, and, as shown in Figs. 1 to 3, inclusive, of the drawings, is closed at its lower portion with a bottom L and is formed with a cylindrical hollow of about equal size throughout its length. The upper portion of the vessel is provided on its outer surface with a number of projections $a$, usually three, equidistant apart, to engage the inclined grooves $b$ in the cover B, which is formed with a central opening $b'$ for the passage of the stem C, used for operating the separating-disk. Secured to the lower surface of the cover and around the opening $b'$ therein is a washer or ring $b^2$, of rubber or other suitable material, through which the stem C passes to allow it to be moved or turned, yet to prevent the escape of the liquid from the vessel. The cover B is formed with an annular rim or flange $b^3$, which is provided with inclined grooves $b$, each commencing with a vertical opening $b^4$, and are for the reception of the pins $a$ on the vessel, as above stated.

The separating disk or plate D is somewhat smaller than the cavity of the vessel and is formed with two segmental openings $d$, which are closed by means of the doors or shut-offs $d'$, secured on the stub $d^2$, formed with a groove $d^3$ to receive the reduced portion $c$ of the operating-stem. Secured to the periphery of the disk D is an annular cushion or ring $e$, made of rubber or other soft material and employed to produce a close fit of the disk within the vessel, yet to allow the disk to be moved therein. The upper central portion of the disk D is provided with a tubular piece or socket $d^4$, whose upper end is formed with a vertical slot $g$ and a horizontal slot $g'$ for the reception of the pin $c'$ on the lower end of the operating-stem. As shown in Figs. 2 and 3, the grooved stub $d^2$ fits within the tube or socket $d^4$ and passes through the disk and is riveted or otherwise rigidly fixed to the segmental doors $d'$, which lie closely against the lower surface of the disk and close the similarly-shaped openings $d'$ therein. The periphery of the disk D (see Figs. 2 and 3) is formed with a curved portion $h$ and has secured on its lower surface an oppositely-curved portion or ring $h'$, which portions embrace or clamp the cushioning-ring $e$, as shown, and securely hold it in position.

In Fig. 7 I have shown a portion of the disk provided at its periphery and on its lower surface with an enlargement $h^2$, formed with a circular groove to receive the ring $e$, and in Fig. 8 have illustrated a part of the disk with a fork $h^3$ at its periphery to receive a flat ring or cushion $e'$, while in Fig. 9 is illustrated another manner of securing a cushioning-ring $e^2$ thereto, which consists in forming the periphery of the disk with a concave enlargement $h^4$, in which the ring $e^2$ may be placed and secured by cement.

It is apparent that I may employ any of the above-described or any other means of securing the cushioning-ring on the disk; but the construction shown in Fig. 2 is preferable.

In Fig. 10 I have illustrated a modified form of the separating-disk, which consists of the disk or plate D', having a single opening $d^5$, which is closed by means of a door or shut-off $d^6$, secured on the stub $d^2$, as before. In this modification the disk may be provided with a cushioning-ring in any of the above-mentioned or other suitable ways and is provided, as before, with a socket-piece $d^4$ for the operating-stem.

In Fig. 11 is shown a modified construction of the vessel, which consists in employing a vessel A', which is open at both of its ends and provided with projections $a$ to engage the covers B' and B², which are identical in construction with the cover B, except the cover B' has no opening and the cover B² is provided with an opening $b'$ and a washer $b^2$ near its periphery, as is clearly shown.

The operation of my device is simple and as follows: The liquid or liquids may be placed in the vessel, when the cover B, with the separating-disk D lying close to its lower surface and the operating-stem C passing through its opening, may be placed on the top of the vessel and there secured by a slight turn, which will cause the projections $a$ to engage the inclined grooves $b$, thereby forcing the cover downwardly until the washer $b^5$ rests against its upper end, which will prevent leakage. The vessel may then be inverted, when the lighter liquid will rise, after which the doors or shut-offs $d'$ may be turned, so as to open the openings $d$ in the disk, by turning the stem C, whose reduced portion $c$ and pin $c'$ fit in the groove $d^3$ of the stub $d^2$ and slot $g'$ of the socket, respectively. The disk may then be moved to the dividing-line of the lighter and heavier liquid, when the doors may be turned back to close the openings and the vessel again inverted, when the cover and stem may be removed, thus leaving the disk in the position shown in Fig. 1 of the drawings, so that the lighter liquid I will rest on the bottom L of the vessel and the heavier liquid I' remain in the upper portion thereof to be emptied or drank.

In using the construction shown in Fig. 11 the cover B², with the disk lying close thereto and the stem extending through its opening, may be secured on one end of the vessel and the liquid then placed therein, after which the cover B' may be placed and secured on the other end of the vessel. The shut-off or door $d^6$ may then be turned and the disk moved by means of the stem to the dividing-line of the two liquids, when the door or shut-off $d^6$ thereof may be closed by turning the stem, after which the vessel may be inverted and the stem, together with the cover B², removed, thus leaving the lighter liquid in the lower part and the heavier liquid I' in the upper part of the vessel.

It is apparent that instead of using the disk D' and cover B² the cover B and disk D may be employed on the modified form of the vessel, and it is also apparent that the disk D' and cover B² may be used on a vessel constructed as shown in Figs. 1 and 2 of the drawings.

Having thus fully described my invention, what I claim as new, and desire to secure by Letters Patent, is—

1. A liquid-separator comprising a vessel having a removable cover at one of its ends and a suitable closure at its other end, a flat apertured movable disk located within the vessel between said cover and closure, a flat shut-off pivotally secured on the disk, and means to turn said shut-off and to move the disk.

2. The combination with a vessel having a closure at one of its ends, of a removable cover having an opening therethrough at its other end, an apertured movable disk between said cover and closure, a shut-off pivotally secured on the disk and a removable operating-stem adapted to pass through the opening in the cover and to engage and move the disk and turn the shut-off, substantially as described.

3. The combination with a vessel having a closure at one of its ends, of a removable cover having an opening therethrough and a washer around said opening at its other end, an apertured movable disk between said closure and cover provided with a cushioning-ring at its periphery, a horizontally rotary shut-off secured on the disk, and a removable operating-stem adapted to pass through the openings in the washer and cover and to engage and move the disk and turn the shut-off, substantially as described.

4. The combination with the vessel A, provided at one of its ends with the bottom L, and having at its other end the projections $a$, of the removable cover B, provided with the central opening $b'$, washer $b^2$, and annular flange or rim $b^3$, having the inclined recesses $b$, an apertured movable disk located between said bottom and cover, a shut-off pivotally secured on the disk and an operating-stem adapted to pass through the openings in the washer and cover and to engage and move the disk and turn the shut-off, substantially as described.

RUFUS H. PARK.

Witnesses:
 CHAS. C. TILLMAN,
 E. A. DUGGAN.